(12) United States Patent
Matsubayashi (10) Patent No.: US 8,416,852 B2
(45) Date of Patent: Apr. 9, 2013

(54) VIDEO SIGNAL CODING SYSTEM AND METHOD OF CODING VIDEO SIGNAL FOR NETWORK TRANSMISSION, VIDEO OUTPUT APPARATUS, AND SIGNAL CONVERSION APPARATUS

(75) Inventor: Kei Matsubayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1694 days.

(21) Appl. No.: 11/716,653

(22) Filed: Mar. 12, 2007

(65) Prior Publication Data

US 2007/0263725 A1 Nov. 15, 2007

(30) Foreign Application Priority Data

Mar. 23, 2006 (JP) .................................. 2006-081618

(51) Int. Cl.
*H04N 7/12* (2006.01)
(52) U.S. Cl. ................................. 375/240.16
(58) Field of Classification Search .................. 375/240, 375/240.01, 240.12, 240.16; 386/353, 355, 386/356
See application file for complete search history.

(56) References Cited

U.S. PATENT DOCUMENTS

| 6,983,019 B2* | 1/2006 | Yiwen et al. | 375/240.16 |
| 7,082,166 B2* | 7/2006 | Prakash et al. | 375/240.25 |
| 7,477,691 B1* | 1/2009 | Knee | 375/240.26 |
| 2002/0126753 A1* | 9/2002 | Kato et al. | 375/240.03 |
| 2005/0097543 A1* | 5/2005 | Hirayama | 717/168 |
| 2006/0209880 A1* | 9/2006 | Chang et al. | 370/464 |

FOREIGN PATENT DOCUMENTS

| EP | 1 596 605 A2 | 11/2005 |
| JP | 6-121280 | 4/1994 |
| JP | 10-84547 | 3/1998 |
| JP | 084547 | 3/1998 |
| JP | 10-336672 | 12/1998 |
| JP | 336672 | 12/1998 |
| JP | 2001-238218 | 8/2001 |
| JP | 2001-309389 | 11/2001 |
| JP | 2002-502161 | 1/2002 |
| JP | 2005-109703 | 4/2005 |
| WO | WO 03/107686 A1 | 12/2003 |

OTHER PUBLICATIONS

Communication from Japanese Patent Office issued on Oct. 4, 2011 in Japanese Patent Application 2006-81618 (4 pages total).

(Continued)

*Primary Examiner* — Kambiz Zand
*Assistant Examiner* — John B King
(74) *Attorney, Agent, or Firm* — Finnegan, Henderson, Farabow, Garrett & Dunner, L.L.P.

(57) ABSTRACT

A video signal coding system for network transmission includes a video output apparatus and a signal conversion apparatus. The video output apparatus includes a decoding unit decoding an video signal encoded by a coding method using a motion vector and a superimposing unit superimposing reference control information containing at least a motion vector on a blanking period of the video signal, and outputs the video signal with the reference control information superimposed. The signal conversion apparatus includes a separating unit separating the reference control information from the blanking period, an encoding unit encoding the video signal by the coding method using the motion vector, and a motion vector converting unit converting the motion vector in the reference control information into a motion vector corresponding to the coding method in the encoding unit, and the encoding is performed using the converted motion vector.

17 Claims, 7 Drawing Sheets

OTHER PUBLICATIONS

T. Shanableh et al., "Heterogeneous Video Transcoding to Lower Spatio-Temporal Resolutions and Different Encoding Formats", IEEE Transations on Multimedia, vol. 2, No. 2, pp. 101-110, XP011036214 (2000).

J. Hwang et al., "Motion Vector Re-estimation and Dynamic Frame-Skipping for Video Transcoding", Signals, Systems and Computers, Conference Record of the Thirty-Se Cond Asilomar Conference on Pacific Grove, CA, IEEE, vol. 2, pp. 1606-1610, XP010324470 (1998).

A. Yusuf, et al., "An Adaptive Motion Vector Composition Algorithm for Frame Skipping Video Transcoding", Electrotechnical Conference, Proceedings of the 12$^{th}$ IEEE Mediterranean Dubrovnik, vol. 1, pp. 235-238, XP010733770 (2004).

J. Youn et al., Motion Vector Refinement for High-Performance Transcoding, IEEE Transations on Multimedia, vol. 1, No. 1, pp. 30-40, XP011036284 (1999).

European Search Report issued Jul. 18, 2011, in Munich in EP 07 25 1212.

Communication from the European Patent Office dated Oct. 31, 2012 in corresponding European Patent Application No. 07 251 212.2-3332 (7 pages).

Shanableh, Tamer et al., "Heterogeneous Video Transcoding to Lower Spatio-temporal Resolutions and Different Encoding Formats," IEEE Transactions on Multimedia, vol. 2, No. 2, Jun. 2000 (10 pages).

* cited by examiner

FIG. 9

VIDEO SIGNAL CODING SYSTEM AND METHOD OF CODING VIDEO SIGNAL FOR NETWORK TRANSMISSION, VIDEO OUTPUT APPARATUS, AND SIGNAL CONVERSION APPARATUS

CROSS REFERENCES TO RELATED APPLICATIONS

The present invention contains subject matter related to Japanese Patent Application JP 2006-081618 filed in the Japanese Patent Office on Mar. 23, 2006, the entire contents of which being incorporated herein by reference.

BACKGROUND OF THE INVENTION

1. Field of the Invention

The present invention relates to a system, method and apparatus in which encoding using a motion vector can be performed efficiently in the case of using AV apparatuses in combination to encode a video signal for network transmission.

2. Description of the Related Art

In general, using Internet and other networks, live video currently obtained from, for example, video phone, video conference and remote security monitoring is transmitted, and recorded video, for example, a video content is also transmitted to be distributed. Such transmission of video via networks has been performed using dedicated terminals, but lately AV apparatuses such as a video camera, VTR, PC (Personal Computer), network-supported television receiver, STB (Set-Top Box) and telephone unit have been combined to transmit such video.

In order to transmit video signals via a network, the video signals are normally encoded and compressed before being transmitted to the network in relation to a bandwidth of the network. For example, when a system in which a video signal is encoded for video phone is obtained using one dedicated terminal incorporating an imaging unit such as CCD camera and an encoding circuit, the dedicated terminal can be designed to balance the volume of video signals with encoding processing in processing steps where the video signal supplied from the imaging unit is encoded using the encoding circuit to be transmitted.

On the other hand, in the case where a video camera or the like is used as the imaging unit, and a PC and network-supported television receiver are used as the encoding circuit, the video signal coding system for video phone is obtained using these apparatuses. In such case, the volume of video signals and encoding processing are not necessarily optimized, since these apparatuses are originally made for different purposes.

Figure 1:
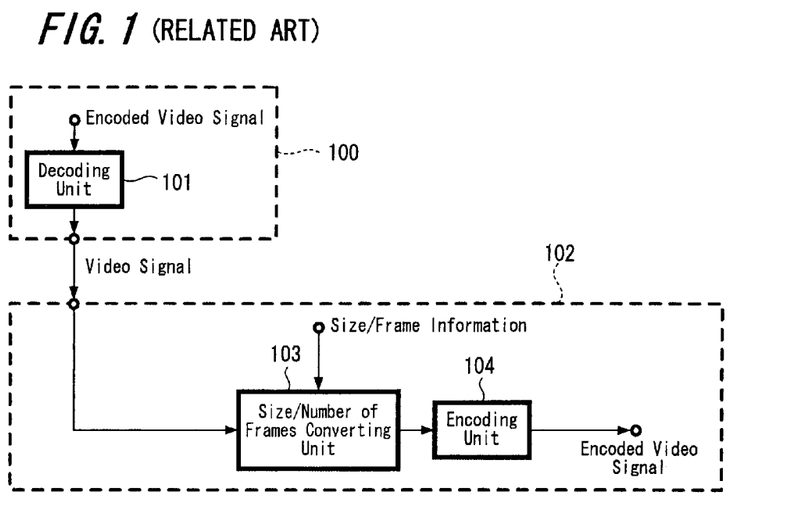
FIG. 1 is a block diagram showing an example of a configuration of a video signal coding system for network transmission formed by a combination of AV apparatuses in related art.
Figure 2:
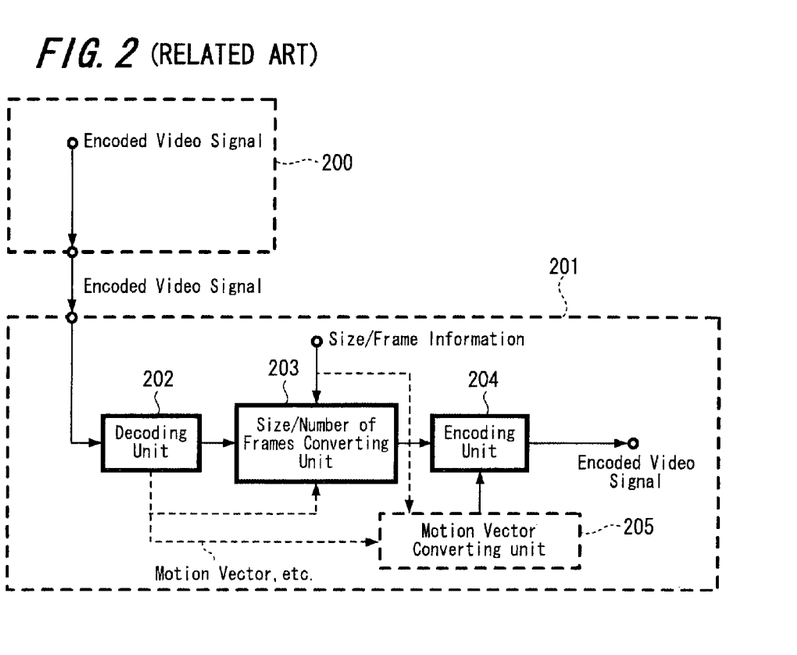
FIG. 2 is a block diagram showing an example of a configuration of a video signal coding system for network transmission formed by a combination of AV apparatuses in related art.

FIGS. 1 and 2 are block diagrams showing examples in related art in which such video signal coding systems for network transmission are configured using a combination of AV apparatuses, respectively. It should be noted that an apparatus on the side of encoding video signals, such as a PC, network-supported television receiver and STB is herein termed a "signal conversion apparatus" and an apparatus on the side of supplying the video signals to the "signal conversion apparatus", such as a video camera and VTR is herein termed a "video output apparatus".

FIG. 1 shows an example in which a decoding unit 101 in a video output apparatus 100 decodes a video signal encoded using, for example, the MPEG-2 into a video signal such as an uncompressed composite signal. Subsequently, the uncompressed video signal is output from the video output apparatus 100 and input into a signal conversion apparatus 102.

The input video signal is first supplied to a size/number of frames converting unit 103 in the signal conversion apparatus 102. The size/number of frames converting unit 103 reduces a screen size and the number of frames of the video signals based on size/frame information (information specifying the screen size and the number of frames corresponding to a display apparatus on the other end of video phone), thereby reducing the volume of video signals to be suitable for network transmission. The video signals the volume of which is thus reduced are encoded by an encoding unit 104 using a coding method for video phone (for example, H.261 and MPEG-4 Part 10 (AVC)), and transmitted to the network from a network interface (not illustrated).

FIG. 2 shows an example in which a video signal encoded using the MPEG-2 or the like is output from a video output apparatus 200 and input into a signal conversion apparatus 201.

The encoded video signal is first decoded by a decoding unit 202 and afterward supplied to a size/number of frames converting unit 203 in the signal conversion apparatus 201. The size/number of frames converting unit 203 reduces a screen size and the number of frames of the video signals based on size/frame information, thereby reducing the volume of video signals to be suitable for network transmission. The video signals the volume of which is thus reduced are encoded by an encoding unit 204 using a coding method for video phone, and transmitted to the network from a network interface (not illustrated). (A motion vector converting unit 205 is described later.)

Among video transmissions through networks, in particular, video phone, video conference, and remote security monitoring may require highly efficient encoding for real-time video transmission. A method using a motion vector is generally used as a highly efficient coding method, however processing of detecting the motion vector at the time of encoding may require a huge amount of calculation that is more than half the whole encoding processing.

Therefore, in the case where the uncompressed video signal is input into the signal conversion apparatus 102 as shown in the example of the configuration according to FIG. 1, a large-scale circuit that performs a great amount of calculation for detecting the motion vector may need to be provided in the encoding unit 104. As a result, not only the cost of such large-scale circuit raises a product price, but also a large amount of power consumption caused by this circuit may be inconvenient for a consumer.

Japanese Unexamined Patent Application Publication No. 2001-238218 (paragraphs 0024 to 0026, and FIG. 1), on the other hand, discloses the following technology with respect to the case where the encoded video signal is input into the signal conversion apparatus as shown in the example of the configuration according to FIG. 2. In this proposed technology, the motion vector converting unit 205 is provided to convert a motion vector output from the decoding unit 202 into a motion vector corresponding to the coding method implemented in the encoding unit 204 (and corresponding to the reduced screen size and number of frames specified by the size/frame information). Accordingly, the calculation cost necessary for the encoding is reduced in comparison to such a case that the motion vector is detected from scratch.

However, in the configuration according to FIG. 2, the signal conversion apparatus 201 may need to include the decoding unit 202 corresponding to the coding method of the video signal (for example, MPEG) implemented in the video output apparatus 200. Therefore, AV apparatuses that can be used as the signal conversion apparatus 210 are limited to those corresponding to the coding method implemented in the AV apparatus used as the video output apparatus 200. Accordingly, other AV apparatuses are prevented from representing the configuration shown in FIG. 2.

Further, in the case where the video output apparatus 200 is, for example, a camcorder including a high resolution CCD camera having a large number of pixels, and a video signal output from the CCD camera is encoded with a high compression ratio and output from the video output apparatus 200, a large processing capacity may also be required for decoding the high-compression video signal in the decoding unit 202 included in the signal conversion apparatus 201. Therefore, also in that case, a product price may be raised, and further a large amount of power consumption due to such processing may be inconvenient for a consumer.

SUMMARY OF THE INVENTION

As described above, in the case where a video signal coding system for network transmission is obtained using AV apparatuses in combination and the system includes two apparatuses of a video output apparatus and signal conversion apparatus separately provided, a suitable method for the signal conversion apparatus to perform efficient encoding has not been provided. Therefore, configuration of apparatuses, product price, power consumption, communication quality, and the like have been not necessarily user-friendly.

It is desirable to provide a video signal coding system for network transmission in which highly efficient encoding can be performed using a motion vector in a signal conversion apparatus, in the case where the video signal coding system is obtained using AV apparatuses in combination and the system includes two apparatuses of a video output apparatus and the signal conversion apparatus separately provided. In the video signal coding system, highly efficient encoding can be performed without providing a large-scale circuit consuming large power for detecting the motion vector in the signal conversion apparatus and without providing a decoding unit in the signal conversion apparatus as shown in the example according to FIG. 2.

According to an embodiment of the present invention, there is provided a video signal coding system for network transmission including: a video output apparatus and a signal conversion apparatus. The video output apparatus includes a decoding unit configured to decode a compressed video signal encoded by a coding method using a motion vector, and a superimposing unit configured to superimpose reference control information being output from the decoding unit and containing at least a motion vector on a blanking period of the video signal decoded by the decoding unit. The video output apparatus outputs the video signal with the reference control information superimposed by the superimposing unit. The signal conversion apparatus includes: a separating unit, an encoding unit, and a motion vector converting unit, and the encoding unit performs encoding using a motion vector converted by the motion vector converting unit. In the separating unit, the reference control information is separated from the blanking period of the video signal that is input from the video output apparatus. In the encoding unit, the video signal separated from the reference control information by the separating unit is encoded by the coding method using the motion vector. In the motion vector converting unit, the motion vector contained in the reference control information separated by the separating unit is converted into the motion vector corresponding to the coding method implemented in the encoding unit.

In the above-described video signal coding system, the video output apparatus including the decoding unit performs processing of superimposing the reference control information being output from the decoding unit and containing at least the motion vector on the blanking period of the decoded video signal. Subsequently, the video signal with the reference control information superimposed is output from the video output apparatus.

The signal conversion apparatus performs processing of separating the reference control information from the blanking period of the video signal input from the video output apparatus. Further, the signal conversion apparatus performs processing of converting the motion vector contained in the separated reference control information into the motion vector corresponding to the coding method implemented in the encoding unit. Subsequently, the video signal separated from the reference control information is encoded using the converted motion vector in the encoding unit included in the signal conversion apparatus.

As described above, the motion vector is superimposed on the blanking period of the video signal in the video output apparatus to be output, and the motion vector separated from the video signal is converted according to the coding method implemented in the internal coding circuit and used in the signal conversion apparatus. Accordingly, highly efficient encoding can be performed using the motion vector in the signal conversion apparatus without providing a large-scale circuit consuming large power for detecting the motion vector in the signal conversion apparatus, although the two apparatuses of the video output apparatus and signal conversion apparatus are separately provided from each other.

In addition, since the uncompressed video signal is output from the video output apparatus, there is no need for the signal conversion apparatus to be provided with the decoding unit corresponding to the method of coding the video signal implemented in the video output apparatus. Therefore, an AV apparatus not corresponding to the coding method implemented in the video output apparatus can be used as the signal conversion apparatus.

Next, according to an embodiment of the present invention, there is provided a method of coding a video signal for network transmission. Using the method, the video signal for network transmission is output from a video output apparatus including a decoding unit configured to decode a compressed video signal encoded by a coding method using a motion vector, and the output video signal is input into a signal conversion apparatus that encodes the input video signal for network transmission. The method includes the steps of:

superimposing in the video output apparatus reference control information being output from the decoding unit and containing at least a motion vector on a blanking period of the video signal decoded by the decoding unit;

separating in the signal conversion apparatus the reference control information from the blanking period of the video signal input from the video output apparatus;

converting in the signal conversion apparatus the motion vector contained in the reference control information separated at the separating step into a motion vector corresponding to a specific coding method using a motion vector implemented in the signal conversion apparatus; and encoding in the signal conversion apparatus the video signal separated from the reference control information at the separating step by the specific coding method using the motion vector converted at the converting step.

The method of coding a video signal corresponds to a series of processing steps performed in the above-described video signal coding system according to an embodiment of the present invention, and highly efficient coding using the motion vector can be performed in the signal conversion apparatus without providing a large-scale circuit consuming high power for motion vector detection. In addition, an AV apparatus not supporting the coding method implemented in the video output apparatus can also be used as the signal conversion apparatus.

Next, according to an embodiment of the present invention, there is provided an output apparatus including a encoding unit and a superimposing unit, and outputting the video signal with the reference control information superimposed by the superimposing unit. The encoding unit is configured to encode a video signal supplied from an imaging device by a coding method using a motion vector. The superimposing unit is configured to superimpose reference control information being output from the encoding unit and containing at least a motion vector on a blanking period of the video signal supplied from the imaging device.

The video output apparatus performs processing of superimposing the reference control information being output from the encoding unit that encodes the video signal and containing at least the motion vector on the blanking period of the video signal supplied from the imaging device. Subsequently, the video signal with the reference control information superimposed is output from the video output apparatus.

Therefore, in the case where the video output apparatus is set to collaborate with the signal conversion apparatus included in the above-described video signal coding system according to an embodiment of the present invention, highly efficient coding using the motion vector can be performed in the signal conversion apparatus on a video signal currently obtained by the imaging device. In this regard, there is no need to provide a large-scale circuit consuming large power for motion vector detection in the signal conversion apparatus. In addition, an AV apparatus not supporting the coding method implemented in the video output apparatus can also be used as the signal conversion apparatus.

Next, according to an embodiment of the present invention, there is provided a signal conversion apparatus including: a separating unit, an encoding unit, and a motion vector converting unit, in which the encoding unit performs encoding using a motion vector converted by the motion vector converting unit. The separating unit separates reference control information containing at least a motion vector from a blanking period of an input video signal. The encoding unit encodes the video signal separated from the reference control information by the separating unit by the coding method using the motion vector. The motion vector converting unit converts the motion vector contained in the reference control information separated by the separating unit into the motion vector corresponding to the coding method implemented in the encoding unit.

The signal conversion apparatus is included in the above-described video signal coding system according to an embodiment of the present invention, and highly efficient coding using the motion vector can be performed in the signal conversion apparatus when being set to collaborate with the above-described video output apparatus. In this regard, there is no need to provide a large-scale circuit consuming large power for motion vector detection in the signal conversion apparatus. In addition, an AV apparatus not supporting the coding method implemented in the video output apparatus can also be used as the signal conversion apparatus.

According to embodiments of the present invention, in the case where a video signal coding system for network transmission is obtained using AV apparatuses in combination and the system includes two apparatuses of a video output apparatus and signal conversion apparatus separately provided, the following advantages are obtained. Specifically, highly efficient coding using the motion vector can be performed in the signal conversion apparatus without providing a large-scale circuit consuming large power for motion vector detection in the signal conversion apparatus. In addition, an AV apparatus not supporting the coding method implemented in the video output apparatus can also be used as the signal conversion apparatus since the uncompressed video signal is output from the video output apparatus.

Further, using a video output apparatus according to an embodiment of the present invention, highly efficient encoding using the motion vector can be performed in the signal conversion apparatus on a video signal being currently obtained by the imaging device.

DESCRIPTION OF THE PREFERRED EMBODIMENTS

Figure 3:
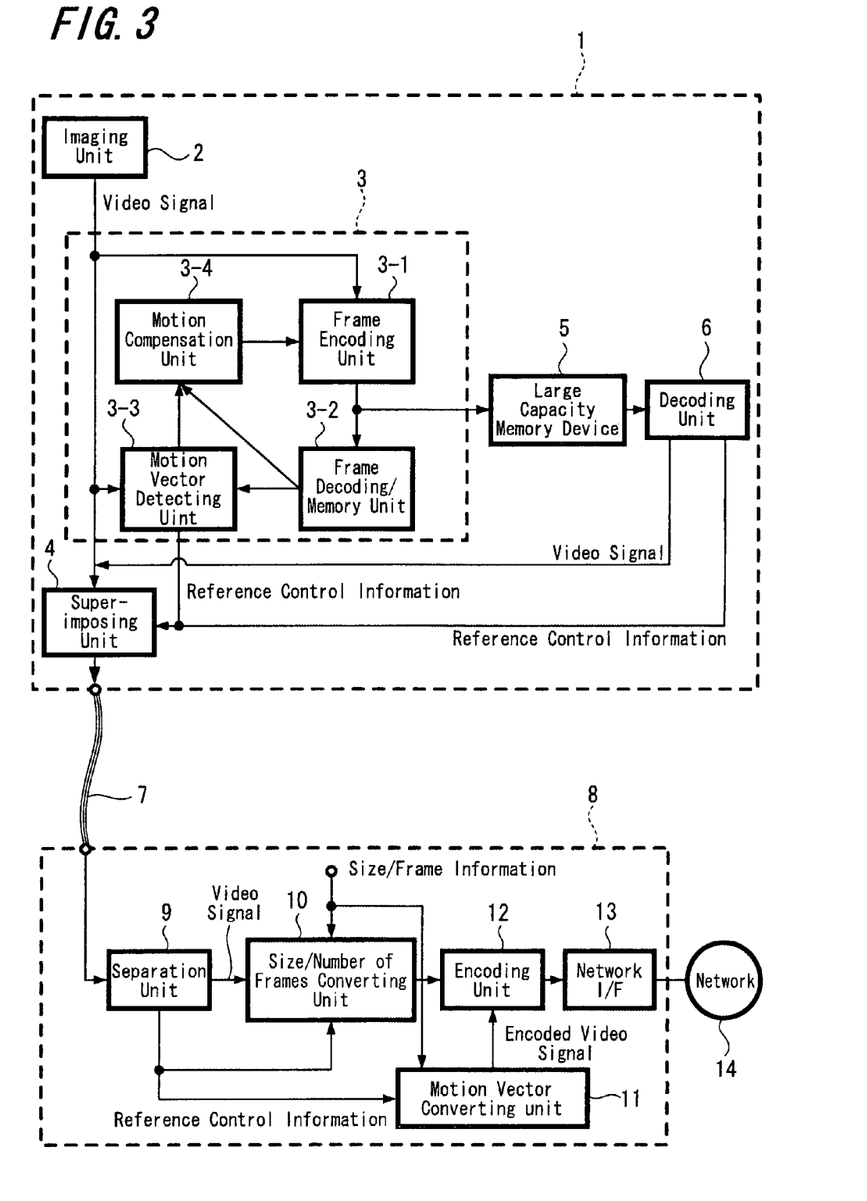
FIG. 3 is a block diagram showing an example of a configuration of a video signal coding system for network transmission to which an embodiment of the present invention is applied.

Hereinafter, preferred embodiments of the present invention are described with reference to accompanied drawings. FIG. 3 is a block diagram showing an example of a configuration of a video signal coding system for network transmission, to which an embodiment of the present invention is applied. The system is provided to encode video signals transmitted through a network for video phone (or video conference or remote security monitoring), and the system is configured to have a video output apparatus 1 and a signal conversion apparatus 8. A camcorder is used as the video output apparatus 1, for example. A network-supported television receiver is used as the signal conversion apparatus 8, for example.

The video output apparatus 1 includes: an imaging unit (for example, CCD camera) 2, encoding unit 3, superimposing unit 4, large capacity memory device (for example, hard disk drive) 5 and decoding unit 6 as circuits and devices related to an embodiment of the present invention. A video signal received from the imaging unit 2 is supplied to the encoding unit 3 and superimposing unit 4.

The encoding unit 3 is, for example, an encoder of the MPEG-2 standard, configuration of which has been known, and therefore only the schematic configuration is illustrated in the figure. A coding method based on the MPEG-2 standard represents an example of a coding method using a motion vector, and a video signal conforming to the MPEG-2 standard is an example of a compressed video signal. A frame encoding unit 3-1 encodes a frame of the video signals supplied from the imaging unit 2. A frame decoding/memory unit 3-2 decodes the encoded video frame and temporarily stores the decoded frame.

A motion vector detecting unit 3-3 detects video blocks of the same type between the frame of the video signal supplied from the imaging unit 2 and the frame previously stored in the frame decoding/memory unit 3-2, and a positional relationship between these video blocks is detected as a motion vector, which is supplied to a motion compensation unit 3-4. The motion compensation unit 3-4 performs motion prediction (compensation) on the frame previously stored in the frame decoding/memory unit 3-2 using the supplied motion vector, and the motion-predicted frame is supplied to the frame encoding unit 3-1. The frame encoding unit 3-1 uses the motion-predicted frame to encode a difference from the frame of the video signals supplied from the imaging unit 2.

When a control panel (not illustrated) of the video output apparatus 1 is operated to output the video signal currently obtained with the imaging unit 2 from the video output apparatus 1, the video signal supplied from the imaging unit 2 is encoded by the encoding unit 3. Further, the motion vector detected by the motion vector detecting unit 3-3, and information on a macroblock type, picture type, picture size and frame rate and the like generated from the processing performed by the frame encoding unit 3-1 is supplied to the superimposing unit 4 from the encoding unit 3 as reference control information.

In addition, when the control panel is operated to record the video signal currently obtained with the imaging unit 2, the video signal supplied from the imaging unit 2 is encoded in the encoding unit 3 and the encoded video signal is stored in the large capacity memory device 5 included in the video output apparatus 1.

Also, when the control panel is operated to output the recorded video signal from the video output apparatus 1, the video signal is reproduced from the large capacity memory device 5 and the reproduced video signal is supplied to the decoding unit 6. The decoding unit 6 is a decoder of the same coding standard as the encoding unit 3, a configuration of which has been known, and therefore a detailed description thereof is omitted.

The video signal decoded by the decoding unit 6 is supplied to the superimposing unit 4. In addition, the information on a motion vector, macroblock type, picture type, picture size, frame rate and the like obtained at decoding in the decoding unit 6, is supplied to the superimposing unit 4 as the reference control information from the decoding unit 6.

The superimposing unit 4 is a circuit that performs processing of superimposing the reference control information on the blanking period of the video signal output from the video output apparatus 1. When the operation to output the video signal currently obtained with the imaging unit 2 from the video output apparatus 1 is performed, the reference control information is supplied from the encoding unit 3 to the superimposing unit 4 as described above, and the superimposing unit 4 superimposes the supplied reference control information on the video signal supplied from the imaging unit 2. In addition, when the operation to output the recorded video signal from the video output apparatus 1 is performed, the reference control information is supplied from the decoding unit 6 to the superimposing unit 4 as described above, and the superimposing unit 4 superimposes the supplied reference control information on the video signal decoded in the decoding unit 6.

The video signal with the reference control information superimposed by the superimposing unit 4 is output from the video output apparatus 1, and transmitted to the signal conversion apparatus 8 through a video cable 7.

The signal conversion apparatus 8 includes a separating unit 9, size/number of frames converting unit 10, motion vector converting unit 11, encoding unit 12 and network interface 13 as circuits related to an embodiment of the present invention. The encoding unit 12 is an encoder of a coding standard for video phone (for example, H.261 and MPEG-4 Part 10 (AVC)).

The video signal input into the signal conversion apparatus 8 through the video cable 7 is supplied to the separating unit 9. The separating unit 9 is a circuit that performs processing of separating the above-described reference control information from the blanking period of the supplied video signal.

It should be noted that a transmission mode of the video signal transmitted from the video output apparatus 1 to the signal conversion apparatus 8 may be an analogue signal such as a composite signal, or a digital signal. In the case of the analogue video signal, the imposing unit 4 may superimpose the reference control information on a line not used for text broadcasting in a vertical blanking interval; the video cable 7 may be a composite video cable or the like generally used; and the separating unit 9 separates the reference control information from the above-described line.

HDMI (High Definition Multimedia Interface) that is a standard for high quality transmission of uncompressed digital video signals has started to be used as a transmission standard for digital video signals. In the case where the video output apparatus 1 and signal conversion apparatus 8 are devices that input and output a video signal conforming to the HDMI standard, the reference control information may be superimposed as described below.

Figure 4:
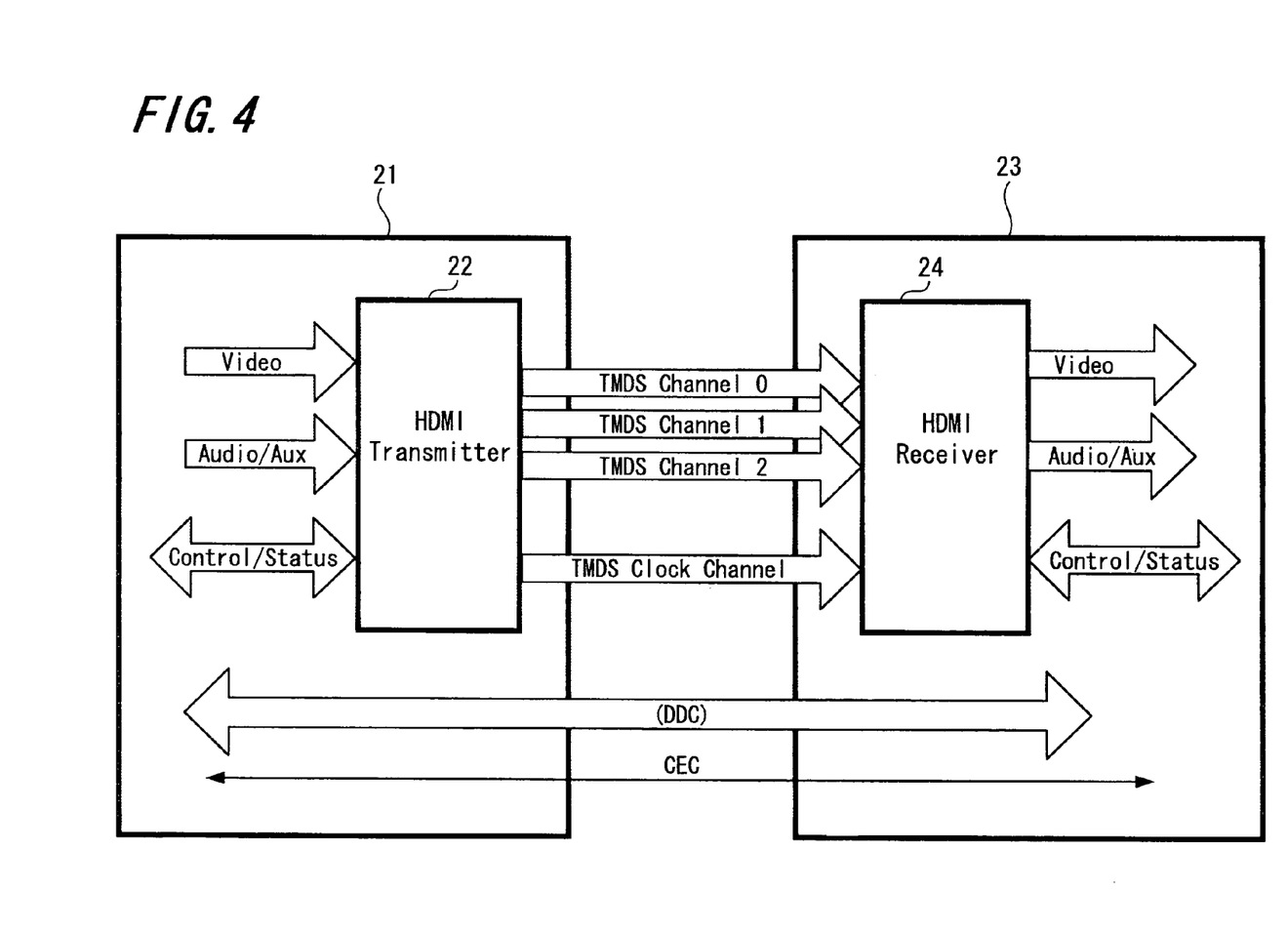
FIG. 4 is a schematic diagram showing a device that conforms to the HDMI standard.

FIG. 4 is a schematic diagram showing devices conforming to the HDMI standard. An HDMI transmitter 22 transmitting a video signal is provided to an HDMI source 21. The HDMI transmitter 22 encodes respective supplied signals of video (video signal), audio/AUX (Auxiliary) and control/status into serial data on three TDMS (Transition Minimized Differential Signaling) channels 0 through 2 to be output, and also outputs a pixel clock of the video from a TMDS clock channel. The data on those channels, data on a DDC (Display Data Channel) for supplying specific information (resolution and the like) regarding a display, and a control signal for bidirectional control based on CEC (Consumer Electronics Control) protocol, which is option, are transmitted to an HDMI sink 23 receiving the video signal from the HDMI source 21 using one cable (HDMI cable).

An HDMI receiver 24 is provided to the HDMI sink 23. The HDMI receiver 24 restores respective signals of the original video, audio/AUX and control/status from the serial data on the TMDS channels 0 through 2 by referring to the pixel clock transmitted on the TDMS clock channel.

Figure 5:
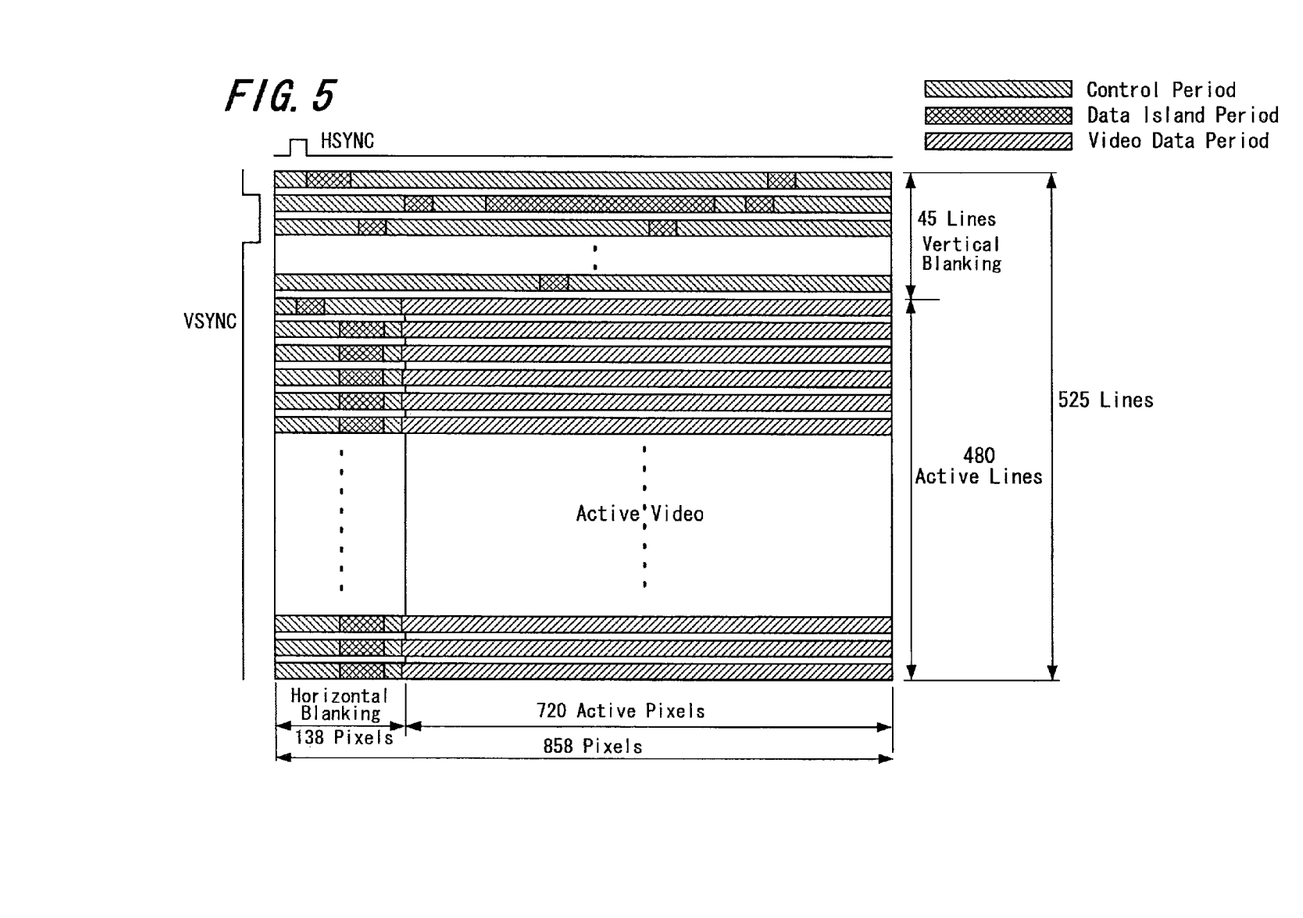
FIG. 5 is a diagram showing an example of a data island period contained in a video frame in the HDMI.

FIG. 5 is a diagram showing an example (in the case where an active video is composed of 720×480 pixels) of a data island period that is a period of transmitting the audio/AUX in a video frame in the HDMI. The data island periods are dispersedly located at specific pixel positions in a horizontal blanking period of 138 pixels of each active line and in vertical blanking period of 45 lines, respectively.

In the case where the video output apparatus 1 and signal conversion apparatus 8 shown in FIG. 3 input and output video signals conforming to the HDMI standard (in other words, those apparatuses are the HDMI source and HDMI sink respectively), the imposing unit 4 and the separating unit 9 may be respectively configured as part of the HDMI transmitter 22 and HDMI receiver 24 shown in FIG. 4 conforming to the HDMI standard. The imposing unit 4 may superimpose the reference control information as a kind of AUX data on the data island period shown in FIG. 5, and the separating unit 9 may separate the reference control information from the data island period. Accordingly, an embodiment of the present invention can also be applied to the case where the video output apparatus 1 and signal conversion apparatus 8 are the devices that input and output the video signals conforming to the HDMI standard.

Returning to the description referring to FIG. 3, the video signal separated from the reference control information by the separating unit 9 and the information on the picture size and frame rate contained in the reference control information are supplied to the size/number of frames converting unit 10 in the signal conversion apparatus 8. Further, the information on a motion vector, macroblock type and picture type that is contained in the reference control information separated by the separating unit 9 is supplied to the motion vector converting unit 11.

The size/number of frames converting unit 10 reduces the screen size and the number of frames of video signals based on size/frame information (information specifying the screen size and the number of frames corresponding to a display apparatus on the other end of video phone), thereby reducing the volume of the video signals to be suitable for the network transmission. The video signals the volume of which is thus reduced are supplied to the encoding unit 12 from the size/number of frames converting unit 10.

The motion vector converting unit 11 performs processing of converting the size of the motion vector and the like on the motion vector contained in the reference control information. The processing is performed corresponding to the coding method implemented in the encoding unit 12 and to the reduced screen size and number of frames reduced as specified by the size/frame information. The motion vector and the like thus converted are supplied to the encoding unit 12 from the motion vector converting unit 11.

Figure 6:
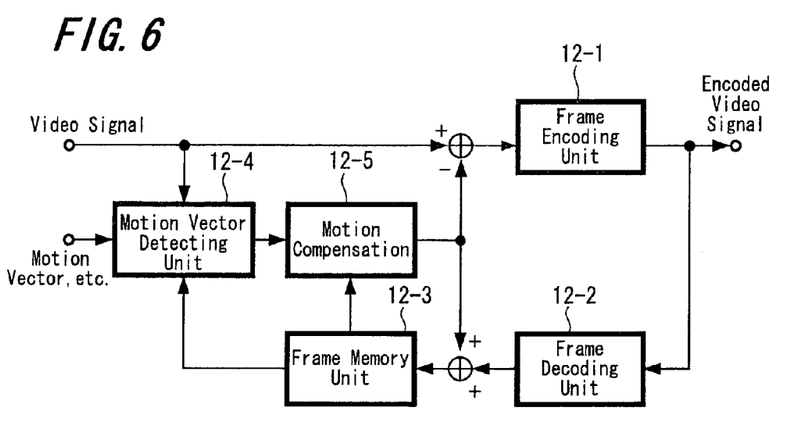
FIG. 6 is a block diagram showing a configuration of an encoding unit included in a signal conversion apparatus.

FIG. 6 is a block diagram showing a configuration of the encoding unit 12. The basic configuration of the encoding unit 12 is common to an encoder of a normal coding standard for video phone, and includes a frame encoding unit 12-1, frame decoding unit 12-2, frame memory unit 12-3, motion vector detecting unit 12-4 and motion compensation unit 12-5.

The frame encoding unit 12-1 encodes the frame of the video signals supplied from the size/number of frames converting unit 10. The frame decoding unit 12-2 decodes the encoded video frame. The frame memory unit 12-3 temporarily stores the decoded frame.

The motion vector detecting unit 12-4 supplies the motion compensation unit 12-5 with a motion vector indicating a positional relationship of video blocks of the same type between the frame of the video signal supplied from the size/number of frames converting unit 10 and a frame previously stored in the frame memory unit 12-3. However, instead of performing the processing of detecting the motion vector from scratch based on the video signal supplied from the size/number of frames converting unit 10, the motion vector detecting unit 12-4 omits the detection of the motion vector overlapping with the motion vector supplied to the encoding unit 12 from the motion vector converting unit 11. Further, the motion vector detecting unit 12-4 performs processing of detecting a motion vector of a block having a different size from the supplied motion vector using the motion vector supplied from the motion vector converting unit 11, and processing of detecting motion vectors surrounding the supplied motion vector by referring to the motion vector supplied from the motion vector converting unit 11. Accordingly, the motion vector detecting unit 12-4 only needs a small-scale circuit and less power consumption in comparison to the case where the motion vector is detected from scratch, and furthermore a detailed motion vector detection can be performed.

The motion compensation unit 12-5 performs the motion prediction (compensation) for a frame previously stored in the frame memory unit 12-3 using the motion vector supplied from the motion vector detecting unit 12-4. The frame encoding unit 12-1 uses the motion-predicted frame for encoding a difference from the frame of the video signals output from the size/number of frames converting unit 10.

The video signals encoded by the encoding unit 12 with the coding method for video phone are transmitted to a network 14 from the network interface 13 as shown in FIG. 3, thereby transmitting the encoded video signals to a device (not illustrated) on the other end of video phone via the network 14.

Figure 7:
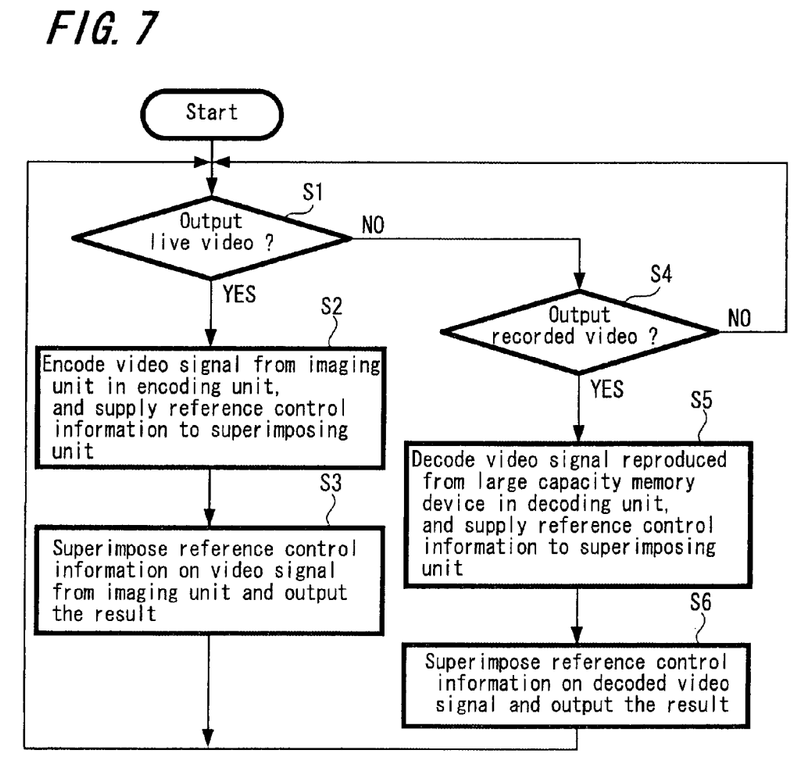
FIG. 7 is a flow chart showing processing in a video output apparatus.
Figure 8:
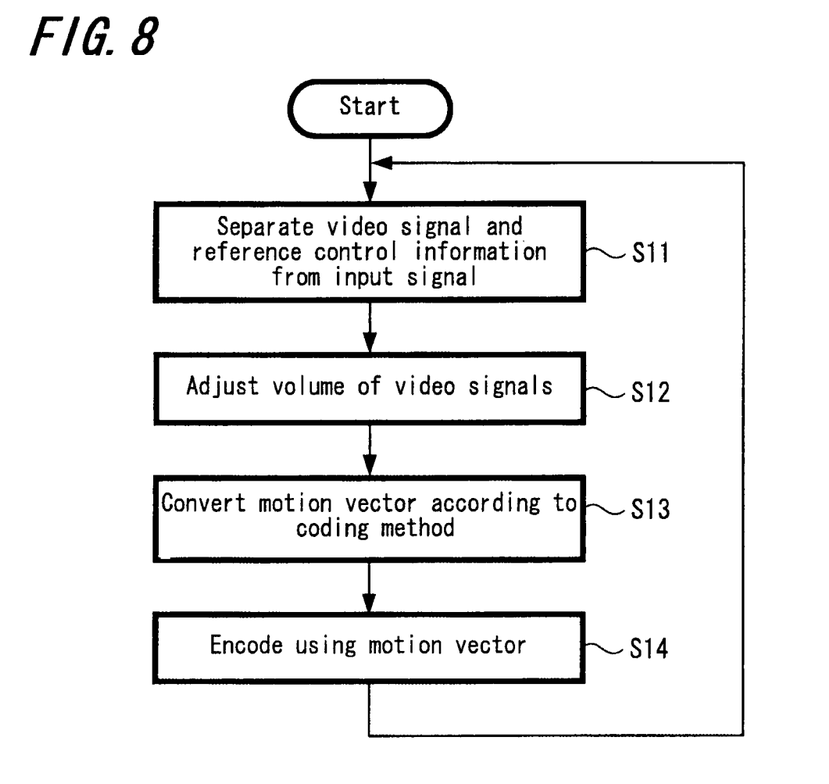
FIG. 8 is a flow chart showing processing in the signal conversion apparatus.
Figure 9:
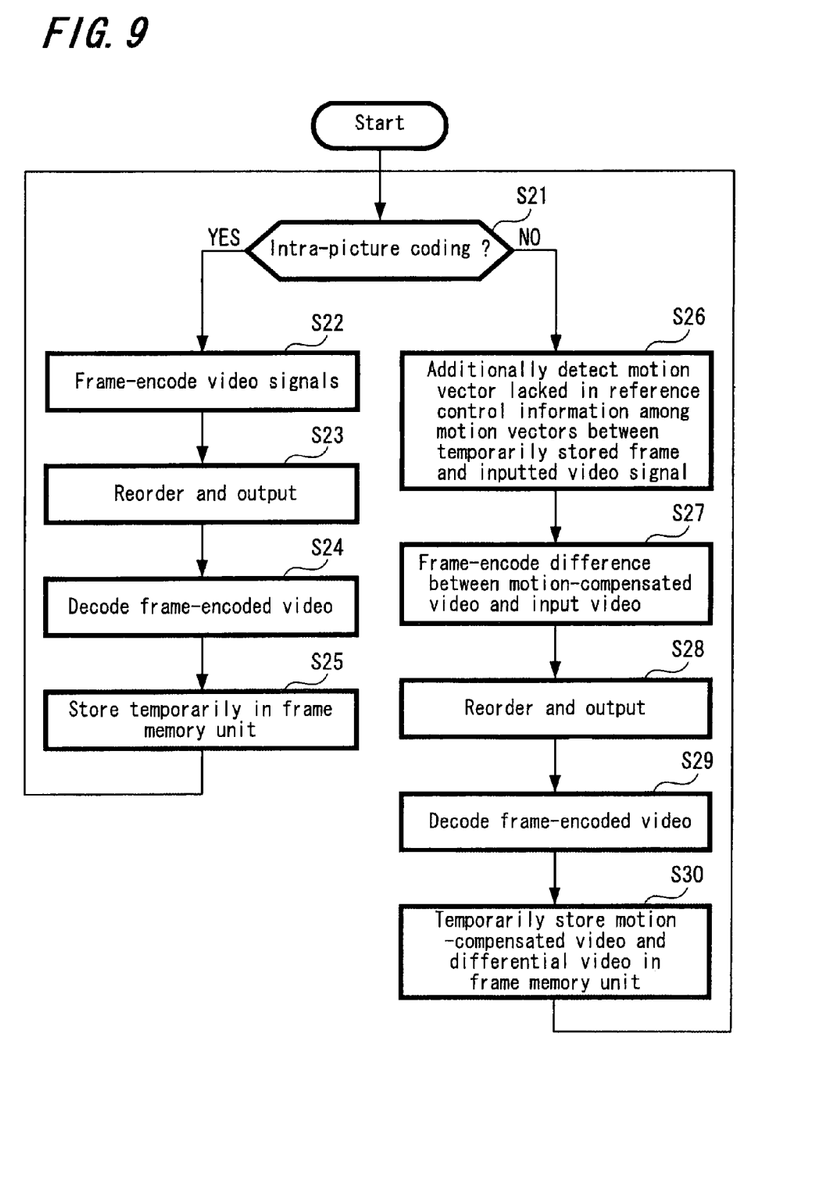
FIG. 9 is a flow chart showing processing in the encoding unit included in the signal converting unit.

FIGS. 7 and 8 are flow charts showing processing steps performed in the video output apparatus 1 and signal conversion apparatus 8 according to FIG. 3, respectively. Further, FIG. 9 is a flow chart showing processing steps performed in the encoding unit 12 included in the signal conversion apparatus 8.

As shown in FIG. 7, in the case where the video signal supplied from the imaging unit 2 is immediately output (more specifically, live video is output) ("YES" at step S1), the encoding unit 3 encodes the video signal supplied from the imaging unit 2, and supplies the reference control information obtained through encoding to the superimposing unit 4 in the video output apparatus 1 (step S2). The superimposing unit 4 superimposes the reference control information supplied from the encoding unit 3 on the blanking period of the video signal supplied from the imaging unit 2, and outputs the video signal from the video output apparatus 1 (step S3). Then, the processing returns to step S1.

On the other hand, in the case where the recorded video is output ("YES" at step S4), the decoding unit 6 decodes the encoded video signal reproduced from the large capacity memory device 5 and supplies the decoded signal to the superimposing unit 4, and also supplies the reference control information obtained through decoding to the superimposing unit 4 (step S5). The superimposing unit 4 superimposes the reference control information supplied from the decoding unit 6 on the blanking period of the decoded video signal, and outputs the video signal from the video output apparatus 1 (step S6). Then, the processing returns to step S1.

As shown in FIG. 8, the separating unit 9 in the signal conversion apparatus 8 retrieves the reference control information superimposed on the blanking period of the input video signal, thereby separating the reference control information from the video signal (step S11). Subsequently, the size/number of frames converting unit 10 adjusts the screen size and the number of frames based on the size/frame information, thereby adjusting the video signals separated from the reference control information to a signal volume suitable for the transmission via the network (step S12). Further, the motion vector converting unit 11 converts the motion vector contained in the separated reference control information in accordance with the coding method implemented in the encoding unit 12 and reduced screen size and number of frames, which are specified by the size/frame information (step S13).

Subsequently, using the converted motion vector, the encoding unit 12 encodes the video signal after the screen size and number of frames have been adjusted by the processing described in FIG. 9 (step S14). Then, the processing returns to step S11 and is repeated to subsequent input video signals.

As shown in FIG. 9, the encoding unit 12 checks whether or not a picture type of the input video signal is intra-picture coding (I-picture) based on the picture type information contained in the reference control information (step S21). In the case of the intra-picture coding, the frame encoding unit 12-1 performs frame-encoding on the input video signals (step S22), reorders and outputs the video signals to be decoded in the same order in a decoding unit in a device on the other end of transmission (step S23).

The frame decoding unit 12-2 decodes the video that is frame-encoded by the frame encoding unit 12-1 (step S24), and the frame memory unit 12-3 temporarily stores the decoded video as a reference picture (step S25). Then, the processing returns to step S21 and is repeated on subsequent input video signals.

In the case where the picture type of the input video signal was not the intra-picture coding at step S21, the motion vector detecting unit 12-4 performs motion vector detection processing of detecting the same video blocks between the video that has been stored in the frame memory unit 12-3 and video that is newly input. Here, the motion vector supplied from the motion vector converting unit 11 is used so that the overlapped motion vector is prevented from being detected, and only a motion vector not contained in the reference control information is additionally detected by detecting a block having a different size and surrounding motion vectors (step S26).

Subsequently, the motion compensation unit 12-5 performs the motion prediction (compensation) for the frame previously stored in the frame memory unit 12-3 using the motion vector supplied from the motion vector detecting unit 12-4, and the frame encoding unit 12-1 performs the frame-encoding on a difference between the motion-predicted frame and the frame of the video signal supplied from the size/number of frames converting unit 10 (step S27). Then, the frame encoding unit 12-1 reorders and outputs the frame-encoded video to be decoded in the same order in a decoding unit in a device on the other end of transmission (step S28).

The frame decoding unit 12-2 decodes the video that is frame-encoded by the frame encoding unit 12-1 (step S29). The frame memory unit 12-3 temporarily stores the video obtained by adding the differential video obtained by the above decoding to the motion-compensated video previously obtained when taking the difference, more specifically, the same video as the video that can be obtained by decoding in the decoding unit included in the device on the other end of transmission (step S30). Then, the processing returns to step S21 and is repeated on subsequent input video signals.

According to the above described video signal coding system, in the case where video signals (live video) being currently obtained with the imaging unit 2 are transmitted via the network, the video signals are output as follows. Specifically, reference control information such as a motion vector is obtained in the encoding unit 3 by encoding the video signal supplied from the imaging unit 2, and is superimposed on the blanking period of the video signal supplied from the imaging unit 2 in the video output apparatus 1, thereby outputting the video signal with the reference control information superimposed.

On the other hand, in the case where the recorded video which was previously obtained with the imaging unit 2 is transmitted via the network, the video signal is output after the processing described below is performed. Specifically, reference control information such as the motion vector obtained by decoding the encoded video signal reproduced from the large capacity memory device 5 in the decoding unit 6 is superimposed on the blanking period of the decoded video signal in the video output apparatus 1, thereby outputting the video signal with the reference control information superimposed.

Accordingly, the reference control information containing the motion vector is superimposed on the blanking period of the video signal that is output from the video output apparatus 1 in both the cases of transmitting the live video and recorded video.

In the signal conversion apparatus 8, the motion vector contained in the reference control information separated from the input video signal is converted into the motion vector corresponding to the coding method for video phone, and the input video signal is encoded using the converted motion vector, thereby transmitting the encoded video signal to the network.

Accordingly, although the two apparatuses of the video output apparatus 1 and signal conversion apparatus 8 are provided separately from each other, the highly efficient encoding can be performed in both the cases of transmitting the live video and recorded video via the network, using the motion vector in the signal conversion apparatus 8 without providing a large-scale circuit consuming large power for motion vector detection in the signal conversion apparatus 8.

In addition, since the uncompressed video signals are output from the video output apparatus 1, there is no need for the signal conversion apparatus 8 to be provided with a decoding unit corresponding to the method of coding the video signal (for example, MPEG-2) implemented in the video output apparatus 1. Therefore, an AV apparatus not corresponding to the coding method implemented in the video output apparatus 1 can also be used as the signal conversion apparatus 8.

Modified examples (1) through (5) regarding the above-described embodiments are described in the followings.

(1) The superimposing unit 4 in the video output apparatus 1 may compress the reference control information and superimpose the compressed information on the blanking period of the video signal, and the separating unit 9 in the signal conversion apparatus 8 may decompress the reference control information separated from the blanking period of the video signal. Accordingly, a limited bandwidth for the blanking period of the transmitted signal can be used efficiently.

(2) Only an efficient motion vector such as a motion vector of a small difference between macroblocks, for example, may be superimposed on the blanking period of the video signal instead of superimposing all the motion vectors on the blanking period of the video signal. Accordingly, the limited bandwidth for the blanking period of the transmitted signal can be used efficiently, in the case of performing highly efficient compression based on a standard such as MPEG-4 using motion vectors from a plurality of video pictures.

(3) Not only the video signal or the like is transmitted from the video output apparatus 1 to the signal conversion apparatus 8, but also a control signal may be inversely transmitted to the video output apparatus 1 from a control unit (CPU or the like) included in the signal conversion apparatus 8, giving instructions to start reproduction, checking the transmission output of the reference control information, giving instructions to input after the transmission, and indicating a transmission volume thereof. For example, in the case of the apparatus conforming to the HDMI standard, the control signal for bidirectional control using the CEC protocol can be transmitted as described above (FIG. 4), and therefore the control signal may be sent to the video output apparatus 1 using the CEC protocol. Accordingly, the reference control information can be transmitted mutually only between AV apparatuses to which the embodiment of the present invention is applied, and the transmission volume can be controlled dynamically.

(4) In the case where only the live video is transmitted via the network, the large capacity memory device 5 and decoding unit 6 need not be provided in the video output apparatus 1. On the other hand, in the case where only the recorded video is transmitted via the network and an AV apparatus not including a imaging unit such as VTR is used as video output apparatus 1, and therefore reproduced video is transmitted via the network, there is no need to supply the reference control information to the superimposing unit 4 from the encoding unit 3 and the reference control information may be supplied only from the decoding unit 6 to the superimposing unit 4.

(5) In the case where video signals output from the video output apparatus 1 are suitable for network transmission without any processing due to a reason that the signal volume is small and the screen size and number of frames of the video signals correspond to the display apparatus on the other end of video phone, processing may be performed as described below. Specifically, in the signal conversion apparatus 8, the processing of reducing the screen size and number of frames is omitted in the size/number of frames converting unit 10, and the video signal separated in the separating unit 9 is directly encoded in the encoding unit 12.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal coding system for network transmission comprising:
   a video output apparatus and a signal conversion apparatus,
      the video output apparatus including
         a decoding unit configured to decode a compressed video signal encoded by a motion vector coding method, the decoded compressed video signal being a decoded video signal; and
         a superimposing unit configured to generate a superimposed video signal by superimposing reference control information being output from the decoding unit and containing at least a motion vector on a blanking period of the decoded video signal,
      the video output apparatus outputting the superimposed video signal; and
   the signal conversion apparatus including
      a separating unit configured to separate the reference control information from the blanking period of the superimposed video signal,
      an encoding unit configured to encode the video signal separated from the reference control information by the separating unit, by the motion vector coding method, and
      a motion vector converting unit configured to convert the motion vector contained in the reference control information separated by the separating unit into a second motion vector corresponding to the motion vector coding method implemented in the encoding unit, and
      the signal conversion apparatus performing encoding in the encoding unit using the second motion vector.

2. The video signal coding system for network transmission according to claim 1,
   wherein the video output apparatus further includes:
      an encoding unit configured to encode a video signal supplied from an imaging device, by the motion vector coding method and
      a memory device configured to store the compressed video signal, the compressed video signal being encoded by the encoding unit; and
   wherein the decoding unit decodes the compressed video signal that is reproduced from the memory device, and in the case where the video signal supplied from the imaging device is output from the video output apparatus, the superimposing unit superimposes the reference control information being output from the encoding unit and containing at least the motion vector on the blanking period of the video signal supplied from the imaging device.

3. The video signal coding system for network transmission according to claim 1,
   wherein the signal conversion apparatus further includes:
      a size/number of frames converting unit configured to reduce a screen size and/or the number of frames of the video signal separated from the reference control information by the separating unit; and
   wherein the motion vector converting unit converts the motion vector contained in the reference control information separated by the separating unit into a motion vector corresponding to the coding method implemented by the encoding unit and to the converted screen size and/or the number of frames having been reduced by the size/number of frames converting unit.

4. The video signal coding system for network transmission according to claim 1, wherein
   the encoding unit in the signal conversion apparatus includes
      a motion vector detecting unit
         configured to omit detecting the motion vector overlapping with the motion vector converted by the motion vector converting unit;
         configured to detect a motion vector of a block having a different size from the motion vector using the motion vector converted by the motion vector converting unit;
         and/or configured to detect motion vectors surrounding the motion vector by referring to the motion vector converted by the motion vector converting unit.

5. The video signal coding system for network transmission according to claim 1, wherein:
   the video output apparatus outputs a digital video signal conforming to the HDMI (High Definition Multimedia Interface) standard, and the superimposing unit is provided in a transmitter that conforms to the HDMI standard, and superimposes the reference control information on a data island period contained in a video frame; and
   the signal conversion apparatus inputs the digital video signal conforming to the HDMI standard, and the separating unit is provided in a receiver that conforms to the HDMI standard and separates the reference control information from the data island period contained in the video frame.

6. The video signal coding system for network transmission according to claim 1, wherein
the signal conversion apparatus further includes:
a control unit configured to send a control signal to the video output apparatus, the control signal indicating whether to transmit the video signal with the reference control information superimposed and/or a transmission volume of the video signals.

7. A method of coding a video signal for network transmission, the video signal being output from a video output apparatus that includes a decoding unit configured to decode a compressed video signal encoded by a coding method using a motion vector, and being input into a signal conversion apparatus to be encoded, comprising the steps of:
superimposing in the video output apparatus reference control information being output from the decoding unit and containing at least a motion vector on a blanking period of the video signal decoded by the decoding unit;
separating in the signal conversion apparatus the reference control information from the blanking period of the video signal input from the video output apparatus;
converting in the signal conversion apparatus the motion vector contained in the reference control information separated at the separating step into a motion vector corresponding to a specific coding method using a motion vector implemented in the signal conversion apparatus; and
encoding in the signal conversion apparatus the video signal separated from the reference control information at the separating step by the specific coding method using the motion vector converted at the converting step.

8. A video output apparatus comprising:
an encoding unit configured to encode a video signal supplied from an imaging device by a coding method using a motion vector and
a superimposing unit configured to superimpose reference control information being output from the encoding unit and containing at least two of a motion vector, macroblock type, picture type, picture size, and frame rate on a blanking period of the video signal supplied from the imaging device, and outputting the video signal with the reference control information superimposed by the superimposing unit.

9. The video output apparatus according to claim 8, further comprising:
a memory device configured to store a compressed video signal encoded by the encoding unit; and
a decoding unit configured to decode the compressed video signal reproduced from the memory device, wherein
in the case where the video signal decoded by the decoding unit is output to the outside, the superimposing unit superimposes the reference control information being output from the decoding unit and containing at least the motion vector on the blanking period of the decoded video signal.

10. The video output apparatus according to claim 8, wherein
the video output apparatus outputs a digital video signal conforming to the HDMI (High Definition Multimedia Interface) standard, and the superimposing unit is provided in a transmitter that conforms to the HDMI standard and superimposes the reference control information on a data island period contained in a video frame.

11. A signal conversion apparatus comprising:
a separating unit configured to separate reference control information containing at least a motion vector from a blanking period of an input video signal;
an encoding unit configured to encode the video signal separated from the reference control information by the separating unit by a coding method using a motion vector; and
a motion vector converting unit configured to convert the motion vector contained in the reference control information separated by the separating unit into a motion vector corresponding to the coding method implemented in the encoding unit, wherein
the encoding is performed by the encoding unit using the motion vector converted by the motion vector converting unit.

12. The signal conversion apparatus according to claim 11, further comprising:
a size/number of frames converting unit configured to reduce a screen size and/or the number of frames of the video signal separated from the reference control information by the separating unit, wherein
the motion vector converting unit converts the motion vector contained in the reference control information separated by the separating unit into a motion vector corresponding to the coding method implemented by the encoding unit and to the converted screen size and/or the number of frames having been reduced by the size/number of frames converting unit.

13. The signal conversion apparatus according to claim 11, wherein
the encoding unit includes
a motion vector detecting unit
configured to omit detecting the motion vector overlapping with the motion vector converted by the motion vector converting unit;
configured to detect a motion vector of a block having a different size from the motion vector using the motion vector converted by the motion vector converting unit; and/or
configured to detect motion vectors surrounding the motion vector by referring to the motion vector converted by the motion vector converting unit.

14. The signal conversion apparatus according to claim 11, wherein
the signal conversion apparatus inputs a digital video signal conforming to the HDMI standard, and
the separating unit is provided in a receiver that conforms to the HDMI standard, and separates the reference control information from a data island period contained in a video frame.

15. The signal conversion apparatus according to claim 11, further comprising:
a control unit configured to output a control signal indicating whether to transmit the video signal with the reference control information superimposed and/or a transmission volume of the video signals.

16. The video signal coding system according to claim 1, wherein the superimposing unit compresses the reference control information and superimposes the compressed reference control information on the blanking period of the video signal.

17. The video signal coding system according to claim 1, the signal conversion apparatus further including:
a control unit configured to transmit a control signal to the video output apparatus, the control signal giving instructions to start reproduction, checking the transmission output of the reference control information, giving instructions to input after the transmission, and indicating a transmission volume.

* * * * *